United States Patent [19]

Creager et al.

[11] Patent Number: 5,091,653
[45] Date of Patent: * Feb. 25, 1992

[54] FIBER OPTIC DOSIMETER USING ELECTRON TRAPPING MATERIALS EMPLOYING TECHNIQUE FOR ELIMINATING BACKGROUND FLUORESCENCE

[75] Inventors: Ramon E. Creager, Gaithersburg; Peter K. Soltani, Olney, both of Md.

[73] Assignee: Quantex Corporation, Rockville, Md.

[*] Notice: The portion of the term of this patent subsequent to Jul. 9, 2008 has been disclaimed.

[21] Appl. No.: 292,350

[22] Filed: Dec. 30, 1988

Related U.S. Application Data

[63] Continuation-in-part of Ser. No. 127,118, Dec. 1, 1987, Pat. No. 4,855,603.

[51] Int. Cl.$^5$ .................. G01T 1/10; G01T 1/105
[52] U.S. Cl. .................................. 250/484.1
[58] Field of Search .................. 250/484.1 C, 368

[56] References Cited

U.S. PATENT DOCUMENTS

| | | | |
|---|---|---|---|
| 3,136,889 | 6/1964 | Clarke et al. | 250/484.1 C |
| 3,412,248 | 11/1968 | Kastner et al. | 250/484.1 C |
| 4,239,968 | 12/1980 | Kotera et al. | 250/327.2 A |
| 4,492,121 | 1/1985 | Lehto | 250/368 |
| 4,785,183 | 11/1988 | Tsuchino et al. | 250/484.1 B |
| 4,788,434 | 11/1988 | Takahashi et al. | 250/484.1 B |
| 4,822,520 | 4/1989 | Lindmayer | 250/301.4 S |
| 4,855,603 | 8/1989 | Lindmayer | 250/484.1 B |

FOREIGN PATENT DOCUMENTS

| | | | |
|---|---|---|---|
| 117477 | 7/1983 | Japan | 250/368 |
| 2089971 | 6/1982 | United Kingdom | 250/458.1 |

OTHER PUBLICATIONS

P. Braunlich et al., "A Remote Fibre-Optic Microdosimetry Reader", Radiation Protection Dosimetry, vol. 6, No. 1-4, pp. 103-107, Nuclear Technology Publishing (1984).

*Primary Examiner*—Carolyn E. Fields
*Attorney, Agent, or Firm*—Ostrolenk, Faber, Gerb & Soffen

[57] ABSTRACT

A fiber optic dosimeter in which an electron trapping material is held in a probe on the tip of an optical fiber. The probe is placed in a region with the radiation to be measured, and the opposite end of the optical fiber, from which radiation readings are measured, is placed in a location remote from the radiation source. When radiation impinges upon the electron trapping material, electrons in the material are raised to a higher state where they are trapped and stay indefinitely. When infrared light strikes the material, the stored electrons are released from their traps and, upon falling to a lower energy level, emit visible light which can be detected and measured. Thus, to measure the amount of ambient radiation, the electron trapping material is stimulated with infrared light from an infrared source at the opposite end of the optical fiber. This infrared stimulation releases trapped electrons and causes the emission of visible light, at least a portion of which is collected and directed back down the optical fiber to the visible light detector, where it is converted into an electrical signal and measured. The infrared stimulation is modulated to allow for measurement of background fluorescence during radiation exposure when infrared stimulation is not applied. This background fluorescence is then substracted from the gross signal under infrared stimulation to yield a signal which changes linearly with radiation input.

10 Claims, 5 Drawing Sheets

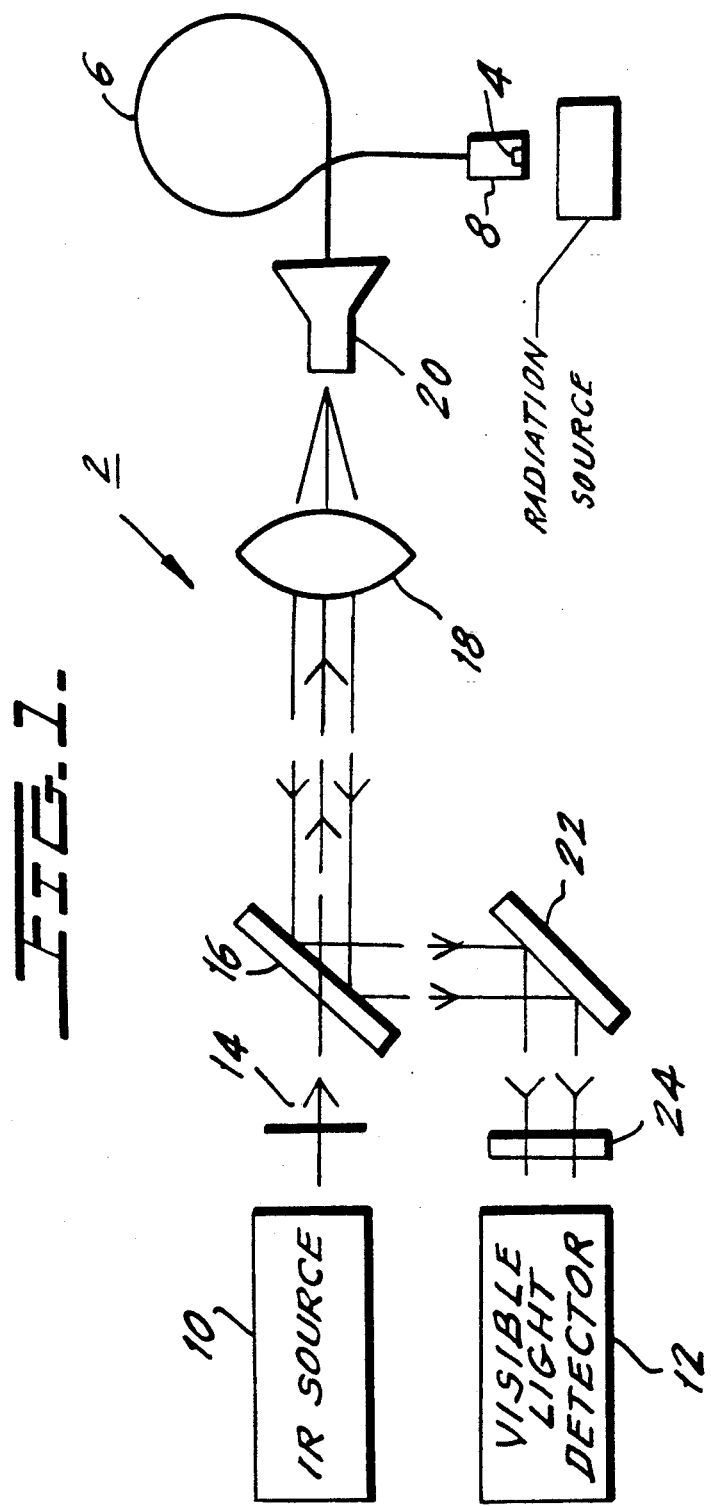

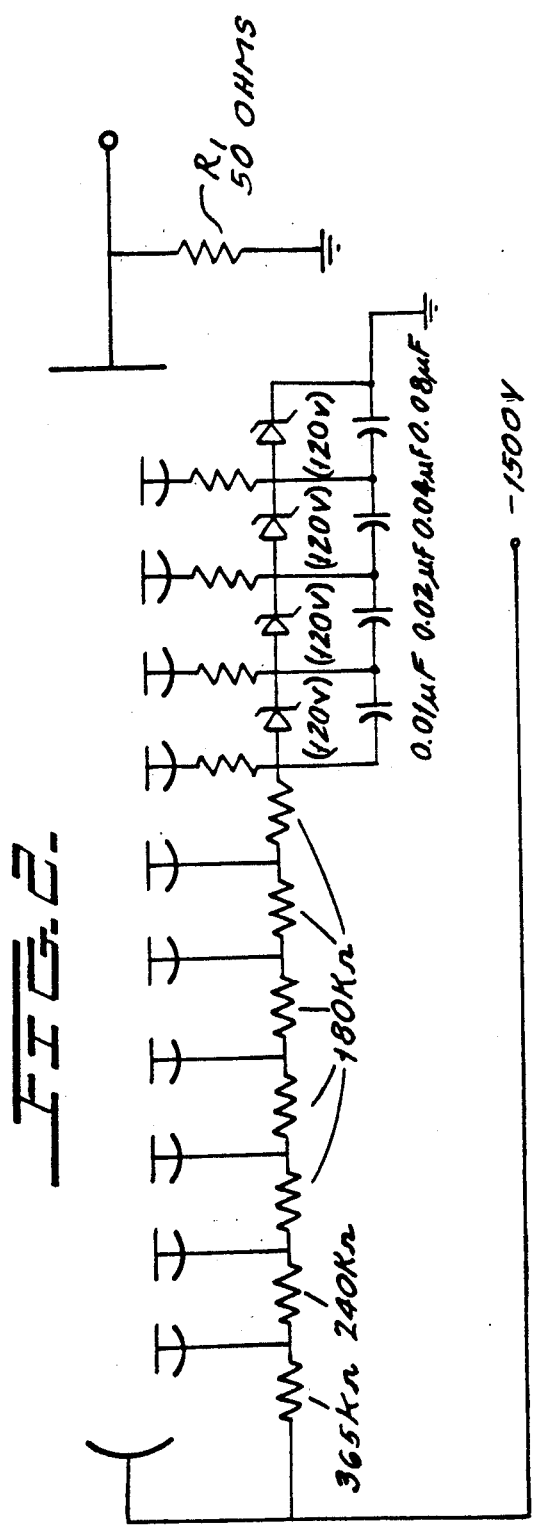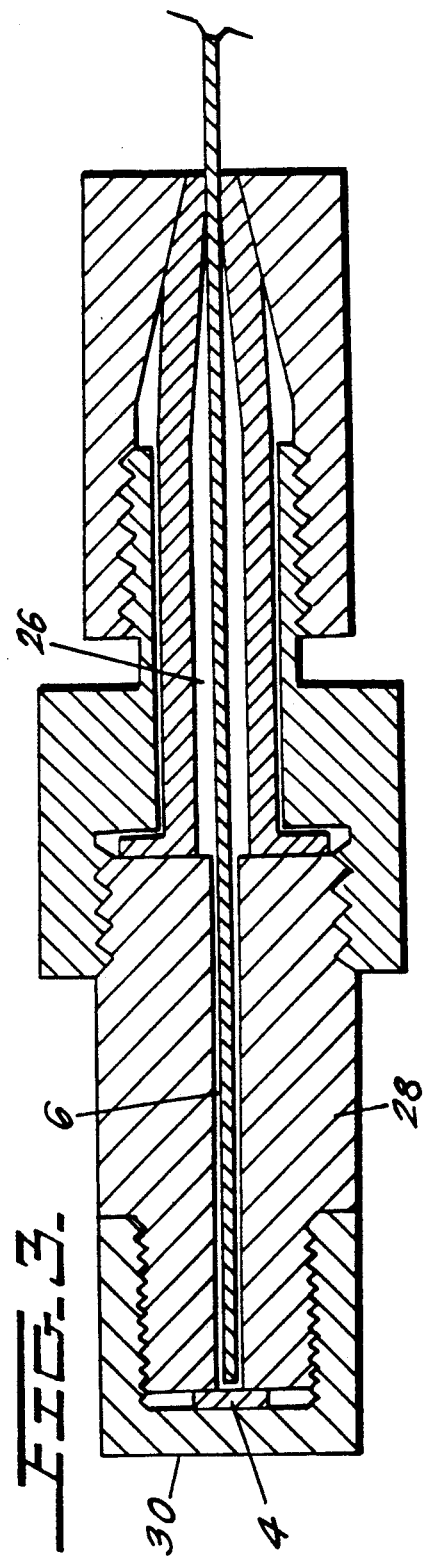

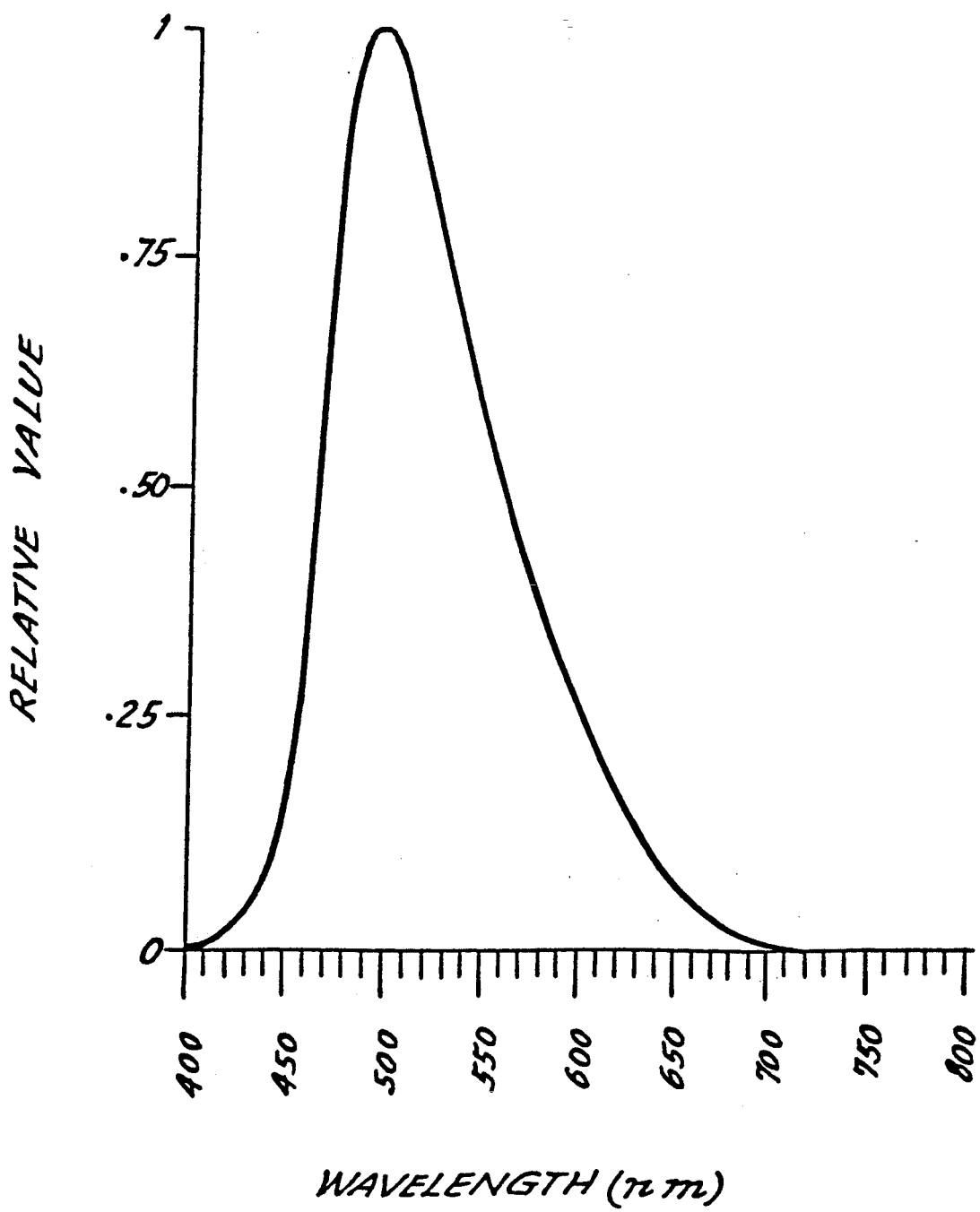

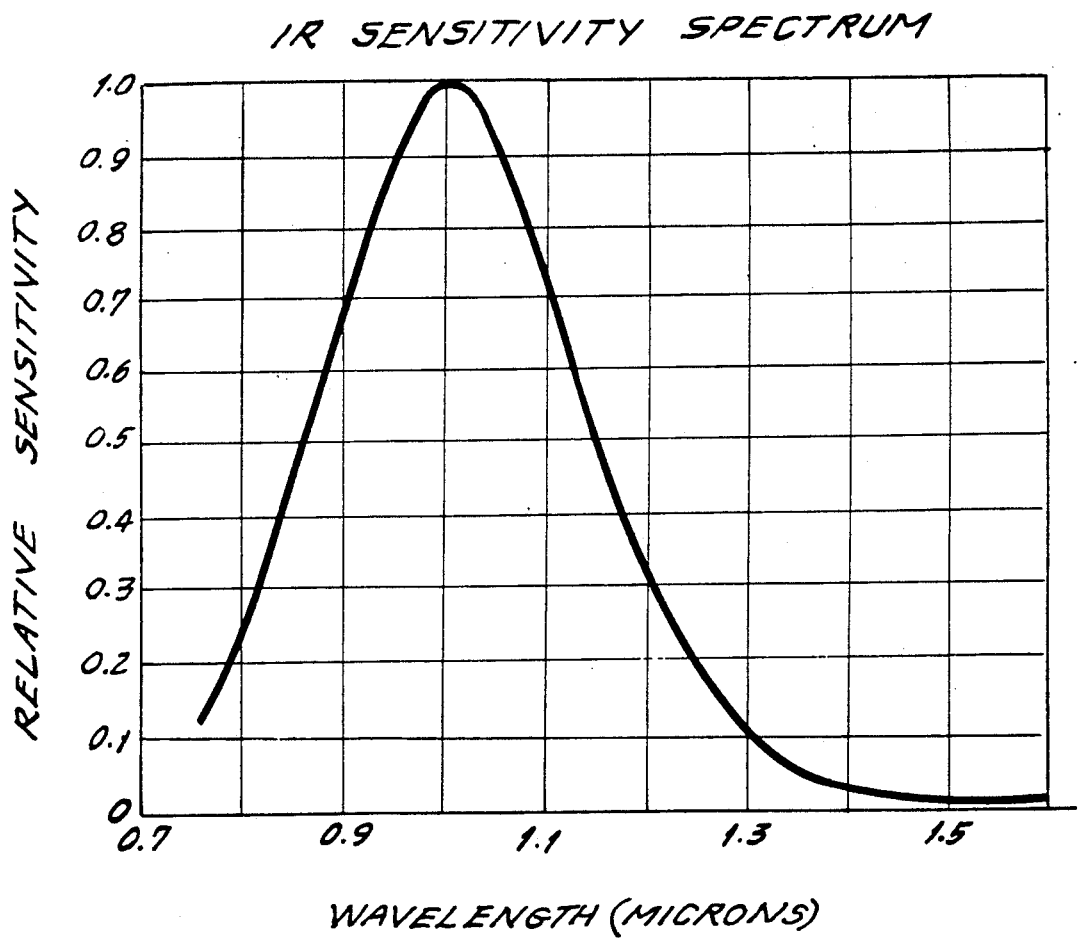

FIBER OPTIC DOSIMETER USING ELECTRON TRAPPING MATERIALS EMPLOYING TECHNIQUE FOR ELIMINATING BACKGROUND FLUORESCENCE

The invention disclosed and claimed herein was made under U.S. Government Contract No. NRC-04.87.364.

RELATED APPLICATIONS

This is a continuation-in-part of U.S. Ser. No. 07/127,118, filed Dec. 1, 1987, now U.S. Pat. No. 4,855,603.

BACKGROUND OF THE INVENTION

1. Field of the Invention

The present invention relates to a system for radiation dosimetry and, more specifically, to a fiber optic dosimeter using electron trapping materials employing a technique for eliminating background fluorescence.

2. Description of the Related Art

Two types of devices are commonly used for radiation dosimetry: continuous radiation monitors or integrating radiation monitors. The most widely used continuous monitors are ionization-type dosimeters, which work by measuring the current produced when radiation ionizes a known volume of a gas, usually air. Integrating dosimeters, on the other hand, measure the total radiation dose received over a fixed period of time. The most common integrating dosimeters are thermoluminescent dosimeters (TLD's). TLD's consist of a type of storage phosphor which, after exposure to ionizing radiation, produces a luminescence when heated, the magnitude of the luminescence being proportional to the radiation exposure.

One problem with existing commercial dosimeters is that they are usually large in size and thus not suitable for use in small or inaccessible areas. Moreover, ionization-type dosimeters require an electrical cable between the probe and the read-out instrument which is susceptible to electromagnetic interference. Also, because the electrical currents produced are usually quite small, the cable must be very short to minimize resistance. Finally, both integrating and continuous radiation monitors are generally limited to a narrow dynamic range of radiation intensities and thus require several different probe configurations to measure over a wide range of radiation intensities.

SUMMARY OF THE INVENTION

Typical dosimeters for continuous radiation monitoring involve the conversion of radiation to a proportionate amount of electrical current. Integrating dosimeters, such as TLD's, involve the conversion of radiation to trapped electrons which can be liberated thermally to produce luminescence proportional to the total radiation dose The present invention involves the conversion of radiation to trapped electrons which can be liberated optically instead of thermally. This method has several advantages over the prior art. First, thermally liberating trapped electrons usually takes several minutes and is prone to error if the heating rate is not well controlled; therefore, TLD's cannot be used as continuous radiation monitors. In the present invention, trapped electrons are liberated optically to produce another optical signal; therefore, it becomes possible to transmit the optical information using an optical fiber, which eliminates the problems with electromagnetic interference and long cable lengths in ionization type dosimeters. Also, the present invention can be used as both an integrating and a continuous radiation monitor.

The conversion of radiation into a population of trapped electrons which can be liberated optically is achieved by using an electron-trapping or so-called storage phosphor. These are solid-state materials containing at least two sets of energy levels within their band-gap, which can be referred to as luminescent centers and electron trapping centers These two sets of energy levels are separated by a finite energy greater than available thermal energy at room temperature. When these materials are exposed to radiation, part of the energy absorbed promotes electrons from a low lying ground state to a higher energy level, from which the electrons relax to a stable trapping level where they can reside for extended periods. When the material is subsequently exposed to photons of substantially less energy than the radiation, the trapped electrons are stimulated to a luminescent center and relax to their low lying ground states; when the electrons undergo such a transition, they give up energy in the form of photons, i.e., luminescence. It is found that the amount of trapped electrons created, and thus the amount of luminescence, is directly proportional to amount of radiation exposure It is therefore clear that these materials may be used as radiation dosimeters.

There are a number of electron trapping (ET) materials exhibiting sufficient radiation sensitivity which can be used in the present invention with suitable system modifications. These materials include alkaline-earth sulfides and their alloys doped with Ce, Sm, barium fluoro-halides doped with $Eu^{2+}$, and others. The various materials differ in their radiation sensitivity, optical stimulation wavelengths and intensities required to liberate trapped electrons, their luminescence wavelength spectrum, and optical time constants. The choice of material depends upon the particular application and the cost of the desired system. The preferred embodiment of the present invention has been designed and adapted to work optimally with a SrS:Ce,Sm type phosphor, whose exact composition and preparation method is described in U.S. Pat. No. 4,822,520, the disclosure of which is herein incorporated by reference. This material exhibits extremely good radiation sensitivity to a wide range of radiation types, such as X-rays, gammas, betas, alphas and protons Also, it has a luminescence wavelength which is extremely well matched to high sensitivity photon detectors, such as photomultiplier tubes (PMT's), and an optical stimulation spectrum for liberating trapped electrons which is well matched by commercial lasers. The luminescence wavelength spectrum of the SrS:Ce,Sm material peaks at about 480 nanometers and its optical stimulation wavelength peaks at about 1 micro-meter wavelength with a peak width of about −0.2 to +0.5 micro-meters; thus, in the present invention, a YAG:Nd near-infrared laser or a suitable laser diode can be used to provide the optical stimulation.

In the method of the present invention, a small amount of a suitable ET material is attached to an optical fiber and placed at a remote site. This can then be exposed to radiation, creating trapped electrons within the material; the material can be optically stimulated by sending photons of appropriate wavelength through the fiber to the remote site. The optically stimulated luminescence produced by the material is then captured by the fiber and travels to the opposite end for detection and display. The magnitude of this signal is directly proportional to the radiation exposure.

There are two methods whereby the electron trapping material may be used for radiation dosimetry. First, it is possible to expose the electron trapping material to a fixed radiation exposure, resulting in the creation of a fixed number of trapped electrons. After the radiation exposure is terminated, the electron trapping material may then be stimulated with continuous infrared and the visible luminescence output monitored until all traps have been depleted. The total infrared stimulated luminescence (IRSL) output may then be determined and correlated to the radiation exposure or the integrated dose.

Alternatively, situations arise where the radiation field is continuous and it is desirable to measure radiation dose rate or exposure rate. In this case, the phosphor is continuously or periodically stimulated with infrared as it is being exposed to the radiation field. However, this method produces two problems; first, the electron trapping material produces a prompt fluorescence under radiation exposure which would add on to the IRSL signal, thus producing a superlinear dosimeter response. Second, the optical fiber, usually fused silica glass, also produces a prompt fluorescence which also adds to the superlinearity of the dosimeter response. Therefore, the fluorescence due to the phosphor and the fiber must be subtracted from the gross signal to extract the IRSL, thus producing a linear response. This is best achieved by continuously turning the infrared on and off and measuring the fiber and fluorescence of the electron trapping material during the IR "off" cycle and subtracting this from the gross signal during the IR "on" cycle. This method can be used to produce a linear dosimeter response to dose rates over $10^6$ using a single probe configuration. Moreover, the fiber can be less than 500 microns in diameter, can be kilometers long, and may be configured to provide both integrated as well as continuous measurement of radiation intensities.

BRIEF DESCRIPTION OF THE DRAWINGS

These and other features and advantages of the present invention will become apparent when the following text is read in conjunction with the accompanying drawings, in which:

FIG. 1 is a schematic layout of the preferred optical testbed which allows for continuous monitoring of radiation;

FIG. 2 is a schematic of the voltage divider base circuit for the photomultiplier used in the dosimeter;

FIG. 3 is a diagram of the probe housing for the dosimeter of the present invention;

FIG. 4 shows the spectrum of light output by the electron trapping material.

FIG. 5 shows the infrared interrogation response of the electron trapping material.

DETAILED DESCRIPTION OF THE PREFERRED EMBODIMENT

Figure 6:
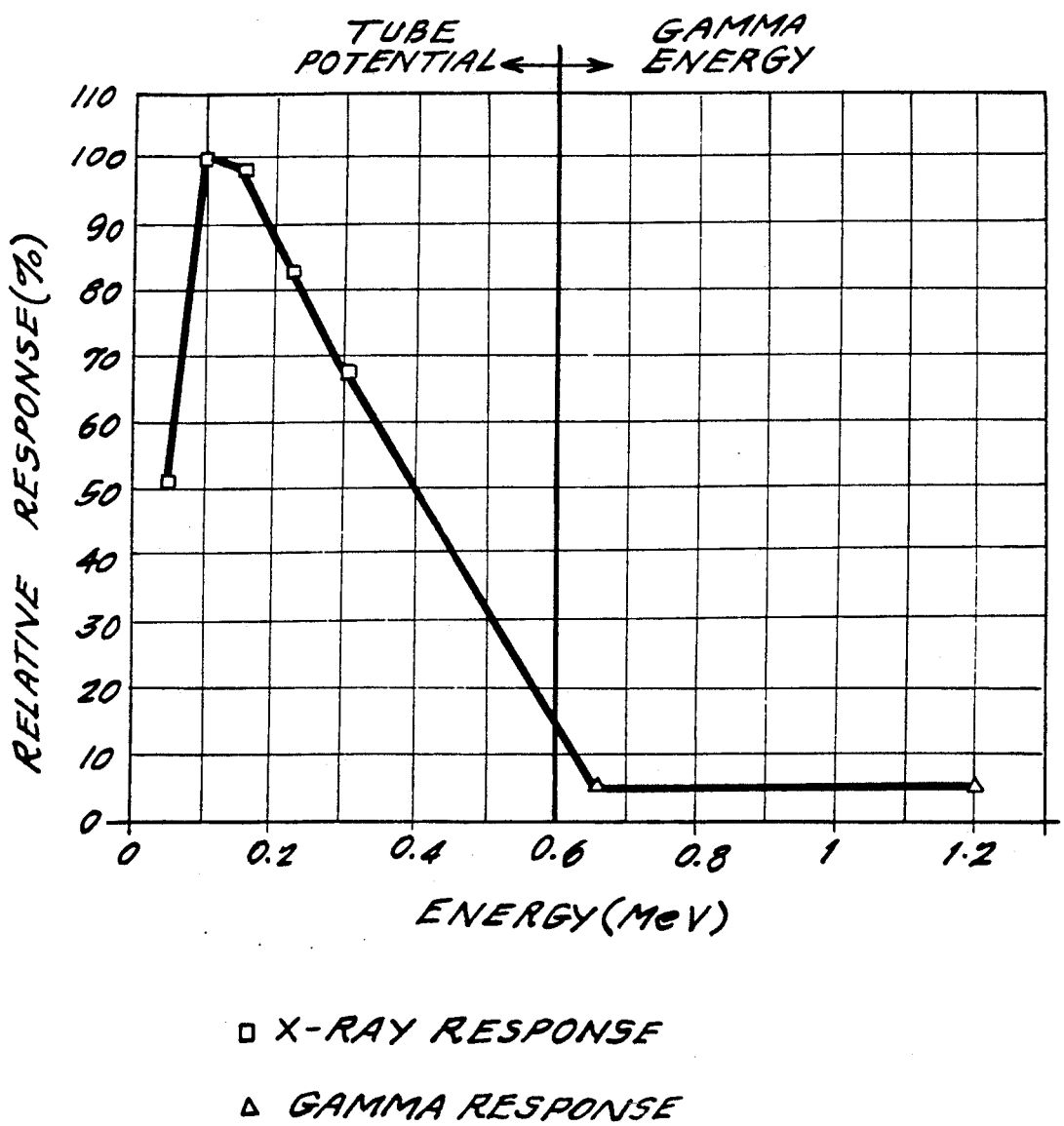
FIG. 6 shows the radiation response of the electron trapping material.

Referring first to FIG. 1, the fiber optic dosimeter of the present invention, indicated generally by reference numeral 2, is shown in a configuration for continuous radiation monitoring. A platelet of electron trapping material 4 is disposed on the tip of one end of an optical fiber 6 to form a microdosimeter 8; this microdosimeter housing is made light tight to prevent extraneous light from reaching electron trapping material 4. The opposite end of optical fiber 6 is optically coupled to an infrared source 10, which can be modulated or continuous depending on the application, and a visible light detector 12. The probe is situated so that the electron trapping material on its tip is exposed to the radiation.

The optical fiber used in the present invention is preferably a high purity fused silica fiber with a 200/380 core/clad diameter (microns) and a numerical aperture (NA) of 0.27. Any similar fiber can be used; however, it is desirable to use fiber which exhibit the least amount of radiation sensitivity.

Infrared source 10 is preferably a YAG:Nd cw laser with a peak emission wavelength of 1.06 micrometer, which is near the peak IR sensitivity of the preferred electron trapping material (see FIG. 5). However, any IR source within the spectral bandwidth of the particular electron-trapping material chosen can be used. The IR can be modulated with any suitable modulator, such as a mechanical chopper, shutter, acousto-optic modulator, all of these being indicated generally in FIG. 1 by reference numeral 14. Alternatively, if a diode IR source is used, it can be electrically modulated.

The IR is passed through a cold mirror 16 which passes the IR but reflects visible light and is coupled to optical fiber 6 using an objective lens 18 with a 0.27 NA, which matches the NA of optical fiber 6; thus, the divergence angle of the focused IR spot is within the acceptance angle of optical fiber 6 so that the maximum amount of infrared light is coupled into the fiber. The fiber itself is held rigidly in a positioner 20 with xyz translation so that it can be aligned with the stationary focused IR spot. Perfect alignment occurs when the IR spot is focused directly in the center of the cleaved fiber surface. The alignment procedure is best achieved by measuring the IR intensity at the probe end of the fiber 6 and adjusting the xyz fiber positioner 20 until the maximum IR intensity exiting the fiber is achieved.

In order to detect the visible luminescence from the electron trapping material which is captured by the fiber, the visible light exiting the fiber is first collimated by objective lens 18. The light is then reflected by two cold mirrors 16, 22 into the detector 12, which can be a photomultiplier tube (PMT) or other type of photon detector, such as a silicon photodiode. A suitable wavelength blocking filter 24 is used in front of the detector 12 to maximize its response to the luminescence from electron-trapping material 4 and minimize its response to the stimulating source, which in this case is infrared.

The preferred photon detector 12 is one which has the maximum spectral response to the electron-trapping material luminescence spectrum. In the present invention, a PMT is used because it provides the maximum sensitivity and is relatively inexpensive. This PMT is configured with a 50 Ohm load and voltage divider base circuit (see FIG. 2) to achieve a 6 nanosecond rise time, allowing for single photon detection. A −1300 volt DC potential is applied to drive the PMT circuit, resulting in a sufficiently strong PMT signal which eliminates the need for a pre-amplifier. Photon counting is preferable over an analog output for one key reason; if an analog output signal is used, the signal has to be digitized and integrated for each chopper cycle and the two subtracted to get the net signal. This requires sophisticated and expensive electronics to allow for real time signal processing and display. With a photon counter, however, only discrete pulses are detected, not an analog signal, so that signal processing and display are achieved in real time. In the preferred embodiment of the present invention, a dual gate photon counter is used. The PMT pulses are fed directly into the photon counter, which is configured to count photons produced during IR stimulation with its "A" gate and to count the photons produced when the IR is off (i.e., measurement of the background fluorescence) with its "B" gate. The counts accumulated by the counter may then be fed via an RS 232 port to a microcomputer for real-time display and subsequent storage.

FIG. 3 shows a diagram of a probe housing for the dosimeter. The fiber is fed through the bore 28 and is held fixed by tightening the compression fitting 26. The diced platelet of electron trapping material 4 is then placed on the fiber holder and an aluminum cap 30 is screwed on to mechanically hold the platelet against the fiber; in this way, use of adhesive epoxies which may darken under radiation exposure is avoided. The thickness of aluminum cap 30 is preferably less than 2 mm; this thickness minimizes gamma and X-ray attenuation through the aluminum before reaching the electron trapping material. In the case of measurement of beta particles, cap 30 is machined with a 2 mm diameter hole and a thin aluminum window is used which does not significantly attenuate beta particles. Monte Carlo electron energy-loss stimulations show that a 125 micron thick aluminum window is suitable for greater than 0.5 MeV beta particles.

The output of detector 12 is an electrical signal which is proportional to the amount of visible light received, which is in turn proportional to the amount of radiation impinging upon electron trapping material 4.

A number of different electron trapping material combinations may be used in the present invention. The following exemplary mixture, which outputs blue-green light, has been found to be particularly sensitive to radiation.

EXAMPLE

Strontium sulfide 100 parts
Barium sulfate 5 parts
Lithium fluoride 10 parts
Samarium 100 parts per million
Cerium oxide 1200 parts per million As used above and throughout this application, "parts" and "parts per million" shall refer to parts by weight unless otherwise noted.

The above mixture and its method of preparation are disclosed in considerable detail in Ser. No. 034,333, filed Apr. 3, 1987, now allowed, and will not be repeated herein. As set forth in co-pending application Ser. No. 127,118, a cesium halide, such as cesium iodide, can be added to the mixture to provide an improvement in emission efficiency.

The mixture (with or without the cesium halide) provides a depth for electron traps of about 1.2 electron volts below the communication band and has an output spectrum as shown in FIG. 4, which illustrates that the center frequency of the output has wavelength of approximately 500 manometers corresponding to a blue-green light. The infrared interrogation response of the mixture is shown in FIG. 5. The radiation response of the mixture is shown in FIG. 6.

The method of preparation disclosed in these applications results in a small-grain phosphor powder which can be bound directly to an optical fiber with an organic binder. However, as mentioned previously, in the preferred embodiment of the present invention, a platelet of the phosphor is used in a probe assembly. Optimum efficiency is obtained by making this platelet as dense as possible. The following process produces a phosphor body of greater than ninety-eight percent of theoretical density.

The process starts with a preferred method of mixing, but any standard ceramic mixing technique may be used. The starting base material, SrS, is placed in a lined milling jar. The samarium and cerium oxide dopents are weighed and added to the jar. Rather than using up to ten (10) percent by weight of flux (lithium fluoride) as disclosed in Ser. No. 034,333, in the present process the amount of flux is reduced to a range of between two tenths (0.2) and one half (0.5) percent by weight of powder being processed. The required amount of flux is weighed out and added to the mix. Liquid and milling media are added, and the jar and contents are rolled on a ball-mill for 6 hours. To this mix is added a compatible organic binder combination, having already been put in solution at a known ratio with the milling liquid. The amount of solution added will yield a binder concentration on the order of one (1) to two (2) percent by weight of the amount of powder being mixed. The jar and contents are rolled an additional two (2) hours.

After the completed mixing time, the mixture is pan-dried on a hot plate at a temperature slightly higher than the boiling point of the solvent used. Once the powder is dry, it is passed through a twenty (20) mesh sieve. The completed powder is compacted using a double acting hard die system. The cavity is filled with the correct amount of powder and pressure applied to both the top and bottom punch. The pressure used is preferably in the range of between 3000 to 6000 PSI (20 MPa–40 MPa).

The density of the resultant compact falls in the range of between 50 to 60% of theoretical. Final densification and activation occur by thermally sintering the compact in a controllable atmosphere tube furnace. The compacts are heated in air to 120° C. at the rate of 50° C./hour and a soak at 120° C. for one (1) hour is needed to allow for drying. To remove the organic binder is then ramped to the binder decomposition temperature (300°–400°) at a rate of 50° C./hour and soaked for 1 hour. At the end of the second soak, nitrogen gas is introduced into the tube and allowed to flow for the remainder of the thermal cycle. The final rise to temperature takes place at 5° C./min (300° C./hour), until a soak temperature of between 1100° C. and 1200° C. is reached A soak of six hours, at temperature, is required for densification. The cooling rate is maintained at 5°/min, (300°/hour) back to room temperature. The resultant compact is then diced into platelets which are inserted in the probe of the present invention.

Fiber microprobe dosimeters have both commercial and governmental applications to determine radiation levels in radiation containment vessels, nuclear reactor facilities, nuclear processing facilities, environments, medical isotope detection, microvolume remote sensing or small entry applications, in vivo dosimetry during tumor radiation therapy, medical radiography, and many other applications. The fiber optic dosimeter of the present invention is particularly suitable for these applications because of its unique capability to:

a) do radiation dosimetry without any electronic devices in the radiation field, using only fiber optic coupling.

b) be small enough to penetrate very small openings, leading to applications such as medical microcatheter measurements.

c) allow massive multiplexing of numerous optical fiber dosimeters while retaining integrated dose data over long intervals between addressing when used in an integrating mode.

d) allow for continuous dose rate monitoring at both high and low radiation levels using the same probe.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A fiber optic dosimeter system, comprising:
   a radiation sensitive phosphor that stores energy from radiation when exposed thereto and releases said stored energy in the form of luminescence when triggered by exposure to optical stimulation, said phosphor comprising:
     a base material of substantially strontium sulfide,
     a first dopant of samarium, and
     a second dopant of cerium oxide;
   a stimulating source for supplying said optical stimulation;
   an optical fiber for optically coupling said phosphor to said stimulating source and for optically coupling said phosphor to a sensor for detecting said luminescence released from said phosphor by converting said luminescence into an electrical signal; and
   a modulator which cooperates with said stimulating source to periodically prevent said optical stimulation from reaching said phosphor, during which time the electrical signal from said sensor corresponds to background fluorescence.

2. A fiber optic dosimeter system as recited in claim 1, further comprising a cesium halide.

3. A fiber optic dosimeter system as recited in claim 2, wherein said cesium halide comprises cesium iodide.

4. A fiber optic dosimeter system as recited in claim 1, wherein said stimulating source comprises an infrared source.

5. A fiber optic dosimeter system as recited in claim 1, wherein said phosphor is mounted in a probe assembly.

6. A fiber optic dosimeter system as recited in claim 1, wherein said modulator comprises a chopper wheel disposed at the output of said stimulating source.

7. A fiber optic dosimeter system as recited in claim 1, wherein said luminescence comprises visible light and said sensor comprises a visible light detector.

8. A method of fiber optic dosimetry, comprising the steps of:
   exposing a radiation sensitive phosphor on a first end of an optical fiber to radiation to be measured to raise electrons in the phosphor to an upper energy level, said phosphor comprising:
     a base material of substantially strontium sulfide,
     a first dopant of samarium, and
     a second dopant of cerium oxide;
   sending optical stimulation from a stimulating source through the optical fiber from a second end to the phosphor to release trapped electrons from said upper energy level, the released electrons emitting visible luminescence upon falling to a lower energy level;
   directing at least a portion of said visible luminescence back into said first end of said optical fiber and measuring the luminescence output at said second end of said optical fiber;
   periodically preventing said optical stimulation from reaching said phosphor and, during these times, measuring the luminescence at said second end of said optical fiber corresponding to background fluorescence; and
   subtracting the luminescence measurement corresponding to background fluorescence from said luminescence measurement when said phosphor is being optically stimulated to arrive at an adjusted measurement representing the actual luminescence of said phosphor caused by said optical stimulation.

9. A method of fiber optic dosimetry as recited in claim 8, further comprising repeating the steps of claim 8 using pulses of said optical stimulation.

10. A method of fiber optic dosimetry as recited in claim 8, further comprising integrating the adjusted measurements of said luminescence at said second end of said optical fiber.

* * * * *